US006712997B2

(12) United States Patent
Won et al.

(10) Patent No.: US 6,712,997 B2
(45) Date of Patent: Mar. 30, 2004

(54) COMPOSITE POLYMERS CONTAINING NANOMETER-SIZED METAL PARTICLES AND MANUFACTURING METHOD THEREOF

(75) Inventors: Jong Ok Won, Seoul (KR); Yong Soo Kang, Seoul (KR); Bum Suk Jung, Seoul (KR); Yeo Sang Yoon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/840,138

(22) Filed: Apr. 24, 2001

(65) Prior Publication Data

US 2002/0145132 A1 Oct. 10, 2002

(30) Foreign Application Priority Data

Dec. 4, 2000 (KR) ....................................... 2000-72958

(51) Int. Cl.[7] .......................... B01J 13/12; B01J 13/14; H01B 1/22

(52) U.S. Cl. ...................... 252/503; 252/511; 252/514; 252/519.51; 252/521.1; 106/1.05; 106/1.13; 427/553; 427/558; 427/597; 427/126.5; 427/126.6; 423/138; 423/592.1; 428/545

(58) Field of Search .......................... 423/69, 138, 155, 423/583, 594; 427/553, 558, 596, 597, 100, 126.5, 126.6; 252/503, 511, 514, 519.32, 519.33, 519.51, 521.1, 520.2; 106/1.05; 428/545

(56) References Cited

U.S. PATENT DOCUMENTS 4,985,399 A * 1/1991 Matsuda et al. ............ 428/195
6,387,012 B1 * 5/2002 Mitamura .................. 427/100

FOREIGN PATENT DOCUMENTS

JP 07024318 * 1/1995 ............ B01J/23/50

OTHER PUBLICATIONS

Zhou et al, "A novel ultraviolet irradiation technique for fabrication of polyacrylamide–metal (M=Au, Pd) nanocomposites at room temperatures", J. Nanoparticle. Research 2001, (3), pp 379–383.*

Ke'ke et al, "Silver Nanoparticles by PAMAM–Assisted Photochemical Reduction of $Ag^+$", J. Colloid. Interface Science, 229, 550–553 (2000) (Publ. Sep. 15, 2000).*

Cheng et al, "Preparation and Characterization of nickel–poly(St–co–AA0 composite nanoparticles", J. Nanoparticle Research, 1(4), 491–494, (1999).*

Cheng et al, "Cobalt particles immobilized on styrene/acrylic acid copolymer particles by ultraviolet irradiation", J. Material Sci. Lett. 18(22), 1859–1860, (1999).*

* cited by examiner

*Primary Examiner*—Yogendra N. Gupta
*Assistant Examiner*—Kallambella M. Vijayakumar
(74) *Attorney, Agent, or Firm*—Rosenberg, Klein & Lee

(57) ABSTRACT

The present invention relates to composite polymers containing nanometer-sized metal particles and manufacturing method thereof, which can be uniformly dispersed nanometer-sized metal particles into polymers, thereby allowing the use thereof as optically, electrically and magnetically functional materials. The method for manufacturing composite polymers containing nanometer-sized metal particles includes the steps of: dispersing at least one metal precursor into a matrix made of polymers in a molecule level; and irradiating rays of light on the matrix containing the metal precursors dispersed in the molecule level and reducing the metal precursors into metals and fixing nanometer sized metal particles inside of matrix.

10 Claims, 4 Drawing Sheets

COMPOSITE POLYMERS CONTAINING NANOMETER-SIZED METAL PARTICLES AND MANUFACTURING METHOD THEREOF

BACKGROUND OF THE INVENTION

1. Field of the Invention

The present invention relates to composite polymers containing nanometer-sized metal particles and manufacturing method thereof, and more particularly, to composite polymers containing nanometer-sized metal particles and manufacturing method thereof, which nanometer-sized metal particles are uniformly dispersed into the polymers, thereby allowing the use thereof as optical, electrical and magnetic materials.

2. Description of the Related Art

In general, nanometer-sized metal or semiconductor particles, i.e., nano-particles, have a nonlinear optical effect. Therefore, composite polymers having the nano-particles dispersed on polymers or glass matrices have attracted people's attentions in optical materials. Moreover, the nano-particles having a magnetic property are applicable in various ways, for example, a use for an electromagnetism storage medium.

In manufacturing the composite polymers, the nano-particles, which are manufactured by the process of vacuum deposit, sputtering, CVD or sol-gel process, mixed with polymer melt in a high temperature or polymer solution dissolved in a proper solvent and dispersed well in a polymer matrix.

A conventional composite polymers obtained by a conventional method by dispersing nano-particles into the polymer matrix, cannot show satisfactory composite material characteristics because a state of the nano-particles is changed due to a high surface energy of the nano-particles and the nano-particles may easily form agglomeration when dispersed on a matrix, i.e., cause a light scattering in using for nonlinear optics.

Nanometer sized particles, which have a finite size effect, have characteristics different from a bulk state. Various attempts have been tried to manufacture metal particles of nanometer size through various physical and chemical processes that has been known to be reliable, in a monodispersion, and have valence of zero, for manufacturing such fine particles.

Such attempts include the steps of sputtering, metal deposition, abrasion, metallic salt reduction, and neutral organometallic precursor decomposition.

Transition metal particles, such as gold (Au), silver (Ag), palladium (Pd) and Platinum (Pt), manufactured as conventional methods are in the form of aggregated powder state or are sensitive to air and tend to be agglomerated irreversibly.

Such an air sensitivity raises a problem in connection with stability when the metal particles present in a large amount. Moreover, the air sensitivity has another problem that the metal particles are collapsed due to oxidation if the final products are not sealed under a high-priced air blocking state during the manufacturing process.

The irreversible agglomeration of the particles needs a separation process which causes a problem in controlling the particle size distribution in a desired range and prevents formation of a soft and thin film, which is essential for a magnetic recording application field. The agglomeration reduces a surface area, which is chemically active for catalytic action, and largely restricts solubility, which is essential for biochemical label, separation and chemical transmission application field.

With the reasons, to exactly adjust a particle size or to manufacture nano-particles having a mono-dispersion phase is an important object in a technical application field of the nano-materials. Therefore, the nano-particles have been manufactured by physical methods such as mechanical abrasion, metal deposition condensation, laser ablation and electrical spark corrosion, and by chemical methods such as reduction of metallic salt in a solution state, pyrolysis of metal carbonyl precursor and electrochemical plating of metals.

Since several physical or chemical methods cause incompatibility and a permanent agglomeration when metal particles accumulated from a vapor state under appropriate stabilizer transfer fluid or transfer fluid containing the appropriate stabilizer. It is impossible to improve the general process of direct dispersion of nanoparticles into the matrices.

Furthermore, even though the metal particles are manufactured in a mono-dispersion phase state, the particles are agglomerated and not dispersed well due to the heat or pressure generated during the process of dispersing the metal particles in the polymer matrix, the metal particles are not compatible with the polymer matrix and defects are generated on the interface.

SUMMARY OF THE INVENTION

It is, therefore, an object of the present invention to provide composite polymers containing nanometer-sized metal particles and manufacturing method thereof, which can keep nanometer-sized metal particles in a well dispersion state in a matrix without a permanent agglomeration.

It is another object of the present invention to provide a simple method, which is capable of easily manufacturing composite polymers in such a manner that the manufacture of nanometer-sized particles and the separate process for composition are performed in-situ.

It is a further object of the present invention to provide a method, which is capable of overcoming a limitation of the amount of metal particles in conventional composite polymers and adjusting the amount of the metal particles in the matrix in a molecule level.

To achieve the object, the present invention provides a method for manufacturing composite polymers containing nanometer-sized metal particles, the method including the steps of: dispersing at least one metal precursor into a matrix made of polymers in a molecule level; and irradiating rays of light on the matrix containing the metal precursors dispersed in the molecular level and reducing and fixing the metal precursors into metals inside of matrix.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 1:
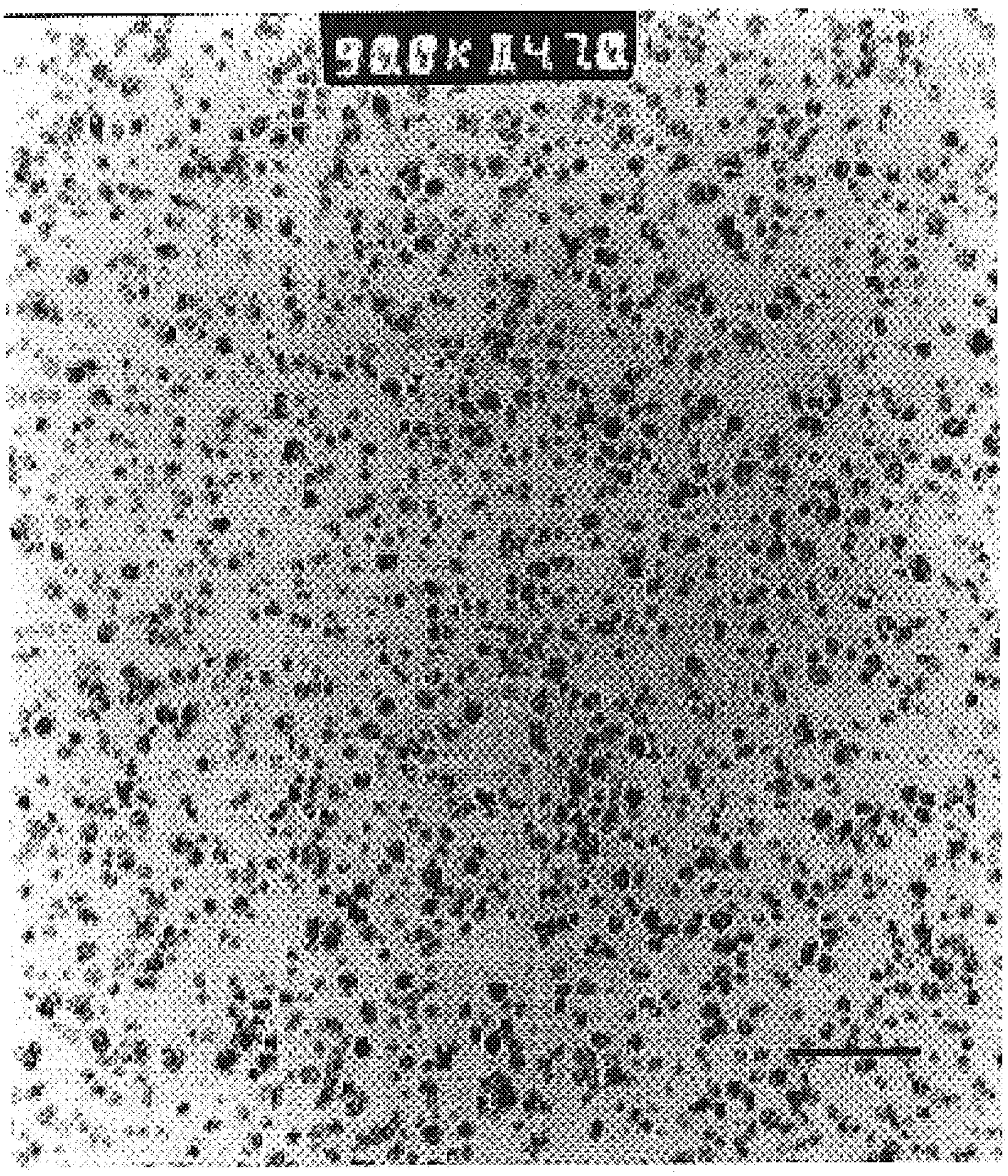
FIG. 1 shows a transmission electron micrograph (TEM) picture of composite polymers of nano-particles formed in a polymer matrix obtained in a thirteenth preferred embodiment of the present invention.
Figure 2:
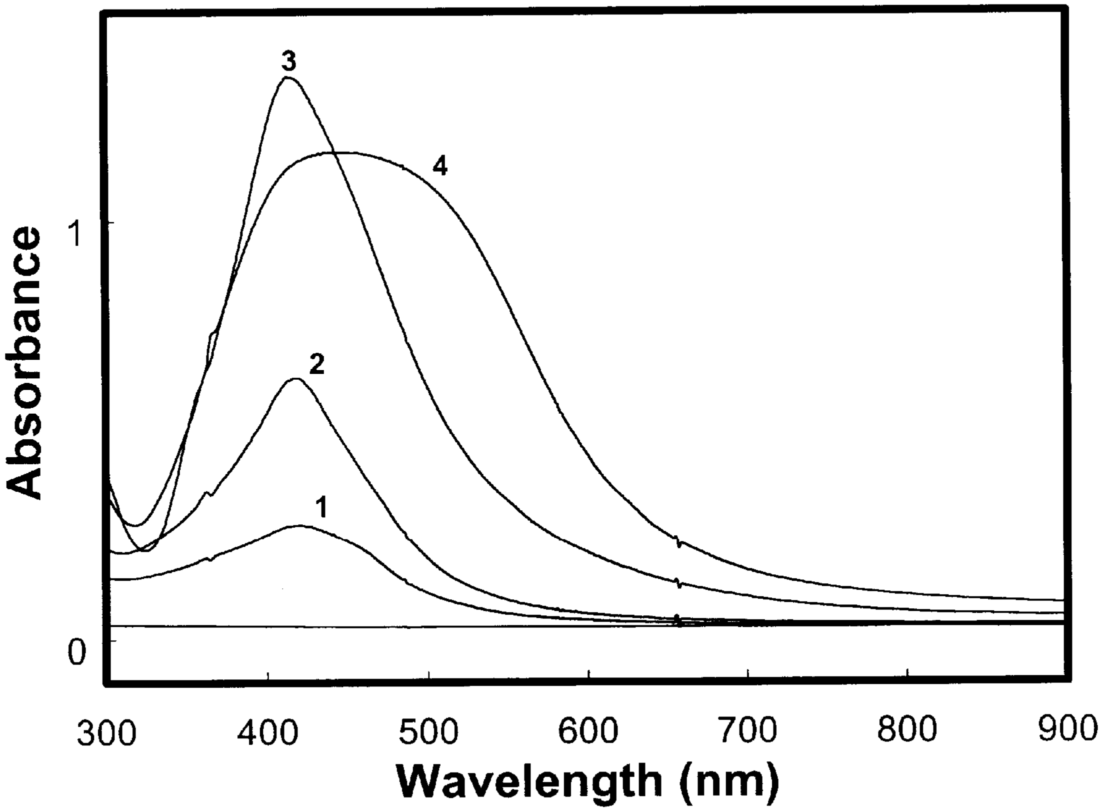
FIG. 2 shows a spectrum of plasmon peaks detected by nanometer-sized Ag particles in the polymer matrix containing nanometer-sized Ag particles manufactured in first to fourth preferred embodiments of the present invention.
Figure 3:
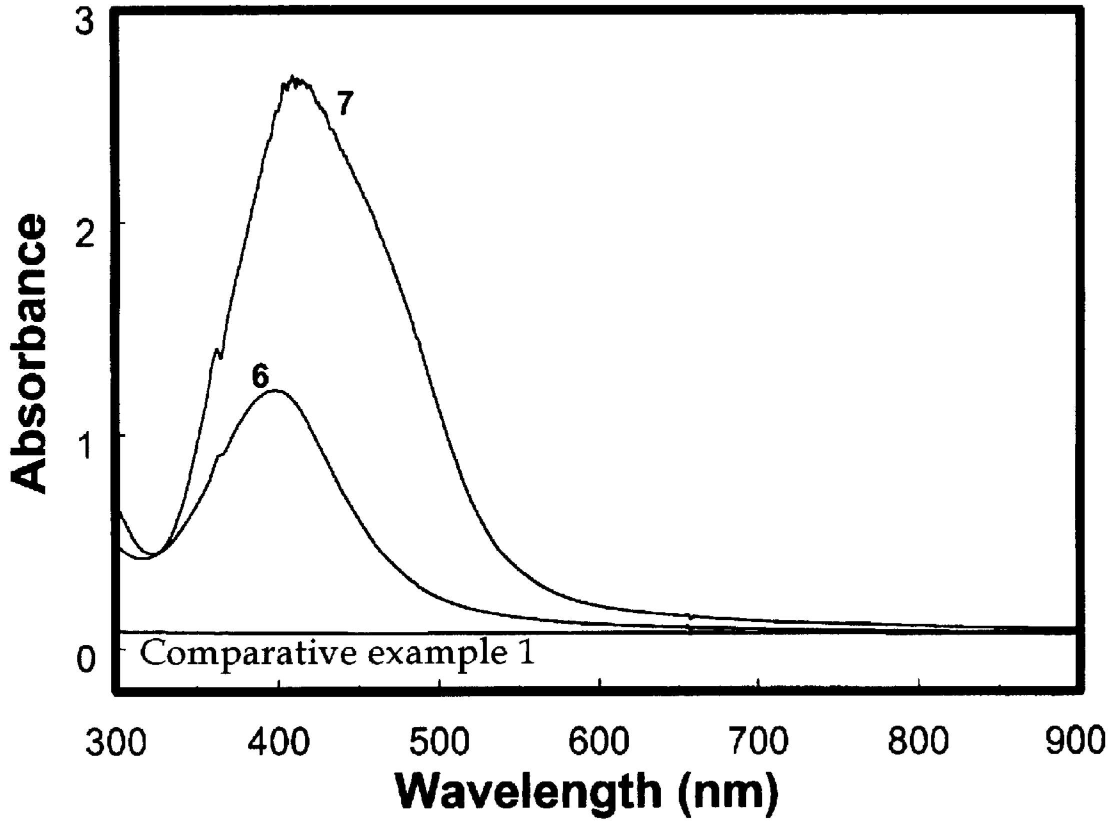
FIG. 3 shows a spectrum of plasmon peaks detected by nanometer-sized Ag particles in the polymer matrix containing nanometer-sized Ag particles manufactured in fifth and sixth preferred embodiments of the present invention.

The present invention will now be described in detail in connection with preferred embodiments with reference to the accompanying drawings.

Metal precursors selected from a group consisting of Au, Pt, Pd, Cu, Ag, Co, Fe, Ni, Mn, Sm, Nd, Pr, Gd, Ti, Zr, Si and In elements, intermetallic compound of the elements, binary alloy of the elements, ternary alloy of the elements, and Fe oxide, besides barium ferrite and strontium ferrite, additionally containing at least one of the elements are dispersed well in a molecular level by an attractive force to the matrix by using a solvent or as a melt and kept in an in-situ state.

The matrix used in the present invention contains polymers having functional groups capable of Π→Π* transition or Π→Π* transition by electron excitation or inorganic materials compatible with the polymers by receiving light having visible (40~70 kcal/mole) and ultraviolet (70~300 kcal/mole) range of energies.

For more detailed description, electrons on double or triple bond or conjugate bonds electrons having the double and triple bonds together absorb a wavelength energy of 200~750 nm range, the Π→Π* transition is caused or the functional groups having electron lone-pair such as oxygen of carbonyl group cause the n→Π* transition.

If the light is irradiated and the electron transition is caused, the conformation is changed or the bonding is broken. In the following table 1, functional groups and wave length, $\lambda_{max}$ leading to the transition are presented, but the present invention is not restricted to the following table.

TABLE 1

| Compound | $\lambda_{max}$ | Compound | $\lambda_{max}$ |
|---|---|---|---|
| $CH_2$=CHCH=$CH_2$ | 217 | $CH_3$—CO—$CH_3$(n → π*) | 270 |
| $CH_2$=CHCHO | 218 | $CH_3$—CO—$CH_3$(π → π*) | 187 |
| $CH_3$CH=CHCHO | 220 | $CH_3$COCH=$CH_2$(n → π*) | 324 |
| $CH_3$CH=CHCH=CHCHO | 270 | $CH_3$COCH=$CH_2$(π → π*) | 219 |
| $CH_3$(CH=CH)$_3$CHO | 312 | $CH_2$=CHCOC$H_3$ | 219 |
| $CH_3$(CH=CH)$_4$CHO | 343 | $CH_3$CH=CHCOC$H_3$ | 224 |
| $CH_3$(CH=CH)$_5$CHO | 370 | $(CH_3)_2$C=CHCOC$H_3$ | 235 |
| $CH_3$(CH=CH)$_6$CHO | 393 | $CH_2$=C($CH_3$)CH=$CH_2$ | 220 |
| $CH_3$(CH=CH)$_7$CHO | 415 | $CH_3$CH=CHCH=$CH_2$ | 223.5 |
| $CH_2$=C($CH_3$)C($CH_3$)=$CH_2$ | 226 | $CH_3$CH=CHCH=CHC$H_3$ | 227 |
| Ph-CH=CH-Ph(trans) | 295 | Ph-CH=CH-Ph(cis) | 280 |
| Styrene | 244, 282 | Sulfide | ~210, 230 |
| C=O in carboylic acid | 200~210 | Acid chloride | 235 |
| Nitrile | 160 | Alkyl bromide, iodides | 250~260 |

If the electrons are excited by the light and broken in the bonding, radical is generated. The radical gives electron to metal ion, and thereby the metal ion is reduced to metal.

The matrix used in the present invention is selected from a group consisting of polypropylene, biaxial orientation polypropylene, polyethylene, polystyrene, polymethyl methacrylate, polyamide 6, polyethylene terephthalate, poly-4-methyl-pentene, polybutylene, polypentadiene, polyvinyl chloride, polycarbonate, polybutylene terephthalate, polydimethylsiloxane, polysulfone, polyimide, cellulose, cellulose acetate, ethylene-propylene copolymer, ethylene-butene-propylene terpolymer, polyoxazoline, polyethylene oxide, polypropylene oxide, polyvinylpyrrolidone, or derivative of them.

Moreover, the polymers used for matrix materials may have one or more functional groups forming radical by absorbing the light in the range of ultraviolet-visible (UV-VIS) ray area and exciting the electrons to break the bonding. However, it is most preferable to have carbonyl group and group having electron lone-pair atoms.

The polymer has a molecular structure, such as linear, nonlinear, dendrimer or hyperbranch polymer structures. Alternatively, blend polymer mixing two or more type polymers having different structures mentioned above may be used.

In the present invention, the amount of the metal precursors is indicated as a molar ratio of a basic functional group unit of the used polymer matrix, and has the molar ratio of metal to matrix functional group in the range from 1:100 to 2:1. If the molar ratio is less than 1:100, the properties of the metal-polymer are not desirable because the amount of metal particles contained in the polymer matrix is very little. If the molar ratio is more than 2:1, the matrix cannot form a free-standing film because the amount of the metal particles is very much.

The structure of the composite material shown in FIG. 1 is of a film type, in which Ag particles are well dispersed in the polymer matrix, but suitable matrices may be selected according to the usages.

The matrix in FIG. 1 is polyvinyl pyrrolidone. $AgBF_4$ is used as metal precursor, and nano-particles in the range of several to several tens of nanometers are formed.

The composite material shown in FIG. 1 can be manufactured as follows.

First, the matrix is dissolved in a solvent, and metallic salt is dissolved or dispersed in the solution to an appropriate ratio.

The solution, in which the matrix and the metallic salt are dispersed well, is cast on a supporter (in this case, a glass plate) to form a film. After evaporating the solvent, the free-standing film is obtained, ultraviolet ray is irradiated on the obtained film and the metallic precursor is reduced into metal.

The obtained composite film having uniform sized metal paticles which are well dispersed in molecular level can be obtained because the polymer matrix prevents the metallic agglomerating.

A conventional composite material in which nanometer-sized metals are dispersed is obtained by a method of dispersing metal particles in the matrix after obtaining the nanometer-sized metal particles by a separate process.

In the conventional method, even though the nano-particles are obtained in a uniform distribution, the particles are not well dispersed and agglomerated together because of an attractive force between the particles, incompatibility to the matrix, or by pressure or heat produced during the process.

However, the composite material according to the present invention has nonlinear optical characteristics by the presence of the metallic nano-particles and can be used as elements for control the phase, strength and frequency of light. Moreover, sensitivity of optical material is increased because the composite material has a high metallic nano-particle content. It has been well known as the characteristics of metallic nano-hybrid polymers without having agglomeration.

With the advantage of forming films having different amount of the nano-particles may be manufactured, if a thickness of a film containing the nano-particles of an appropriate amount and a distance between adjacent metallic nano-particles are adjusted suitably, then the film can be used as a diffraction grating to radiations having wave range of X-rays from far ultraviolet rays. Furthermore, the film may be used as a data storage media using a magnetic property of the metal.

Additionally, the film may be used for various application fields using the nonlinear optical effects of the metallic nano-particles and the characteristics of the matrix (for example, electric conductivity), by regulating the properties of the matrix. If the metallic nano-particles have a catalytic activity, the composite polymers may be used as a catalyst, in which catalytic elements are supported by a heat-resistant matrix.

Hereinafter, the present invention will be described in the following embodiments in detail.

Embodiments 1 to 4

Poly(2-ethyl-2-oxazoline) (POZ; a molecular weight is $5\times10^5$, manufactured by the Aldrich company) was dissolved in water of 20% by weight to manufacture a polymer solution.

$AgCF_3SO_3$ was added to the resulting solution to have a molar ratio of carbonyl as the unit of POZ to silver trifluoro methanesulfonate being 1:1, and dispersed in a molecule level. The manufactured polymer-silver trifluoro methanesulfonate solution was cast on the glass plate in a thickness of 200 $\mu$m. The solvent was evaporated to produce a polymer-silver trifluoro methanesulfonate film.

An ultraviolet lamp irradiated ultraviolet rays on the film in the air. The following table 2 shows values of electric surface conductivity, and plasmon peaks detected due to the silver metal particles and measured using ultraviolet-visible (UV-VIS) spectrometer to each sample.

TABLE 2

| | Ultraviolet irradiation time (hr) | Surface ion conductivity (Ω/cm) |
|---|---|---|
| Comparative example 1 | 0 | 0 |
| Embodiment 1 | 2 | 0.007 |
| Embodiment 2 | 3 | 0.007 |
| Embodiment 3 | 5 | 0.008 |
| Embodiment 4 | 7 | 0.01 |

Embodiments 5 and 6

Poly(2-ethyl-2-oxazoline) (POZ; a molecular weight is $5\times10^5$, manufactured by the Aldrich company) was dissolved in water of 20% by weight to manufacture a polymer solution. $AgCF_3SO_3$ was added into the resulting solution to have a molar ratio of carbonyl as the unit of POZ to silver trifluoro methanesulfonate being 1:1, and dispersed in a molecular level.

The manufactured polymer-silver trifluoro methanesulfonate solution was cast on the glass plate in the thickness of 200 $\mu$m. The solvent was evaporated to produce a polymer-silver trifluoro methanesulfonate film.

An ultraviolet lamp irradiated ultraviolet rays on the manufactured film under nitrogen. The following table 3 shows values of electric surface conductivity to each sample, and plasmon peaks detected due to the silver metal particles and measured using ultraviolet-visible (UV-VIS) ray spectrometer.

TABLE 3

| | Ultraviolet irradiation time (hr) | Surface ion conductivity (Ω/cm) |
|---|---|---|
| Comparative example 1 | 0 | 0 |
| Embodiment 5 | 3 | 0.006 |
| Embodiment 6 | 7 | 0.008 |

Embodiment 7

Poly(2-ethyl-2-oxazoline) (POZ; a molecular weight is $5\times10^5$, manufactured by the Aldrich company) was dissolved in water of 20% by weight to manufacture a polymer solution. $AgCF_3SO_3$ was added into the resulting solution to have a molar ratio of carbonyl to silver trifluoro methanesulfonate being 10:1, and dispersed in a molecular level.

The manufactured polymer-silver trifluoro methanesulfonate solution was cast on the glass plate in the thickness of 200 $\mu$m. The solvent was evaporated to produce a polymer-silver trifluoro methanesulfonate film. An ultraviolet lamp irradiated ultraviolet rays on the manufactured polymer-silver film in the air, and then a composite thin film was manufactured.

Embodiment 8

Poly(2-ethyl-2-oxazoline) (POZ; a molecular weight is $5\times10^5$, manufactured by the Aldrich company) was dissolved in water of 20% by weight to manufacture a polymer solution. $AgCF_3SO_3$ was added into the resulting solution to have a molar ratio of carbonyl as the unit of POZ to silver trifluoro methanesulfonate being 4:1, and dispersed in a molecule level.

In the same way as the embodiment 1, the composite thin film was manufactured using the polymer-trifluoro methanesulfonate solution. The size of silvers manufactured in the polymer matrix was 10 nm on the average, and the silver nanoparticles were dispersed well without agglomeration.

Embodiment 9

Poly(2-ethyl-2-oxazoline) (POZ; a molecular weight is $5\times10^5$, manufactured by the Aldrich company) was dissolved in water of 20% by weight to manufacture a polymer solution. $AgBF_4$ was added into the resulting solution to have a molar ratio of carbonyl to silver tetraflouroborate being 1:1, and dispersed in a molecular level.

In the same way as the embodiment 1, the composite thin film was manufactured using the polymer-silver tetraflouroborate solution. The size of silvers manufactured in the polymer matrix was 9 nm on the average, and the silver nanoparticles were dispersed well without agglomeration.

Embodiment 10

Poly(2-ethyl-2-oxazoline) (POZ; a molecular weight is $5\times10^5$, manufactured by the Aldrich company) was dissolved in water of 20% by weight to manufacture a polymer solution. $AgNO_3$ was added into the resulting solution to have a molar ratio of carbonyl to silver nitrate being 1:1, and dispersed in a molecular level.

In the same way as the embodiment 1, the composite thin film was manufactured using the polymer-silver nitrate solution. The size of silvers manufactured in the polymer matrix was 10 nm on the average, and the silver nanoparticles were dispersed well without agglomeration.

Embodiment 11

Poly(2-ethyl-2-oxazoline) (POZ; a molecular weight is $5\times10^5$, manufactured by the Aldrich company) was dissolved in water of 20% by weight to manufacture a polymer solution. $AgClO_4$ was added to the resulting solution to have a molar ratio of carbonyl to silver perchlorate being 1:1, and dispersed in a molecular level.

In the same way as the embodiment 1, the composite thin film was manufactured using the polymer-silver perchlorate solution. The size of silvers manufactured in the polymer matrix was 9.5 nm on the average, and the silver nanoparticles were dispersed well without agglomeration.

Embodiment 12

Poly vinyl pyrrolidone (PVP; a molecular weight is $1\times10^6$, manufactured by the Polyscience company) was dissolved in water of 20% by weight to manufacture a polymer solution. $AgCF_3SO_3$ was added to the resulting solution to have a molar ratio of carbonyl to silver trifluoro methanesulfonate being 1:1, and dispersed in a molecule level.

In the same way as the embodiment 1, the composite thin film was manufactured on the glass plate using the polymer-silver trifluoro methanesulfonate solution.

Embodiment 13

Poly vinyl pyrrolidone (PVP; a molecular weight is $1\times10^6$, manufactured by the Polyscience company) was dissolved in water of 20% by weight to manufacture a polymer solution. $AgBF_4$ was added to the resulting solution to have a molar ratio of carbonyl to silver tetraflouroborate being 1:1, and dispersed in a molecular level.

In the same way as the embodiment 1, the composite thin film was manufactured on the glass plate using the polymer-silver tetraflouroborate solution. The size of silvers manufactured in the polymer matrix was 9.5 nm on the average, and the silver nanoparticles were dispersed well without agglomeration. As the result, the structure of composite thin film is shown in FIG. 1.

Embodiments 14 to 17

Poly vinyl pyrrolidone (PVP; a molecular weight is $1\times10^6$, manufactured by the Aldrich company) was dissolved in water of 20% by weight to manufacture a polymer solution. $AgBF_4$ was added to the resulting solution to have a molar ratio of carbonyl to silver tetraflouroborate being 2:1, and dispersed in a molecular level.

The manufactured polymer-silver tetraflouroborate solution was cast on the glass plate and ultraviolet ray was irradiated by an hour in the same way as the embodiment 1, to manufacture composite thin film. The size of silver nanoparticles manufactured in the polymer matrix was 9.5 nm on the average, and the silvers were dispersed well without agglomeration. The following table 4 shows values of electric surface conductivity to each sample.

TABLE 4

| | Ultraviolet irradiation time (hr) | Surface ion conductivity (Ω/cm) |
|---|---|---|
| Comparative example 2 | 0 | 0 |
| Embodiment 14 | 0.17 | $9\times10^{-3}$ |
| Embodiment 15 | 0.5 | $5\times10^{-4}$ |
| Embodiment 16 | 1.75 | $2.37\times10^{-3}$ |
| Embodiment 17 | 4 | $3.37\times10^{-3}$ |

Embodiment 18

Poly vinyl pyrrolidone (PVP; a molecular weight is $1\times10^5$, manufactured by the Aldrich company) was dissolved in water of 20% by weight to manufacture a polymer solution. $AgBF_4$ was added to the resulting solution to have a molar ratio of carbonyl to silver tetraflouroborate being 4:1, and dispersed in a molecular level.

In the same way as the embodiment 1, the composite thin film was manufactured on the glass plate using the polymer-silver tetraflouroborate solution. The size of silver nanoparticles manufactured in the polymer matrix was 10 nm on the average, and the silvers were dispersed well without agglomeration.

Embodiment 19

Poly ethylene oxide (a molecular weight is $1\times10^6$, manufactured by the Aldrich company) was dissolved in water of 2% by weight to manufacture a polymer solution. $AgBF_4$ was added to the resulting solution to have a molar ratio of oxygen as the unit of the polymer to silver tetraflouroborate being 1:1, and dispersed in a molecular level.

In the same way as the embodiment 1, the composite thin film was manufactured on the glass plate using the polymer-silver tetraflouroborate solution. The size of silver nanoparticles manufactured in the polymer matrix was 10 nm on the average, and the silver nanoparticles were dispersed well without agglomeration.

Embodiment 20

Poly ethylene oxide (a molecular weight is $1\times10^6$, manufactured by the Aldrich company) was dissolved in water of 2% by weight to manufacture a polymer solution. $AgBF_4$ was added to the resulting solution to have a molar ratio of carbonyl to silver tetraflouroborate being 4:1, and dispersed in a molecular level.

In the same way as the embodiment 1, the composite thin film was manufactured on the glass plate using the polymer-silver tetraflouroborate solution. The size of silver nanoparticles manufactured in the polymer matrix was 12 nm on the average, and the silver nanoparticles were dispersed well without agglomeration.

Embodiment 21

Poly ethylene oxide (a molecular weight is $1\times10^6$, manufactured by the Aldrich company) was dissolved in water of 2% by weight to manufacture a polymer solution. $AgCF_3SO_3$ was added to the resulting solution to have a molar ratio of carbonyl to silver trifluoro methanesulfonate being 1:1, and dispersed in a molecular level.

In the same way as the embodiment 1, the composite thin film was manufactured on the glass plate using the polymer-silver trifluoro methanesulfonate solution. The size of silver nanoparticles manufactured in the polymer matrix was 10 nm on the average, and the silver nanoparticles were dispersed well without agglomeration.

Embodiment 22

$HAuCl_4$ aqueous solution was made in a molar ratio of 8:1 on the basis of terminal amine group using a third generation Starburst, TM, dendrimer (Polyamidoamine; a molecular weight is 6909, manufactured by the Aldrich company). The aqueous solution was mixed with polyvinyl pyrrolidone solution of 20% by weight so that $HAuCl_4$ permeated into the dendrimers and mixed well with the polymers. In the same way as the embodiment 1, the film was manufactured and ultraviolet rays were irradiated, and then composite metal-polymers were manufactured.

The auric ions permeated into the dendrimers were reduced. The golds were wrapped with the dendrimers without agglomeration, and thus composite material having a uniform size distribution and good dispersion were obtained.

The size of the gold particles in the dendrimers measured through the TEM was 4 nm on the average and the golds were dispersed well without agglomeration.

Embodiment 23

$HAuCl_4$ was made into aqueous solution in a molar ratio of 8:1 on the basis of terminal amine group using a fourth generation Starburst, TM, dendrimer (Polyamidoamine; a molecular weight is 14279, manufactured by the Aldrich company). The aqueous solution was mixed with polyvinyl pyrrolidone solution of 20% by weight. $HAuCl_4$ permeated into the dendrimers and mixed well with the polymers. In the same way as the embodiment 1, the film was manufactured and ultraviolet rays were irradiated, and then composite metal-polymers were manufactured.

Auric ions permeated into the dendrimers were reduced and wrapped with the dendrimers without agglomeration among the metals, as a result of which a composite material having a uniform size distribution and good dispersion was obtained.

Figure 4:
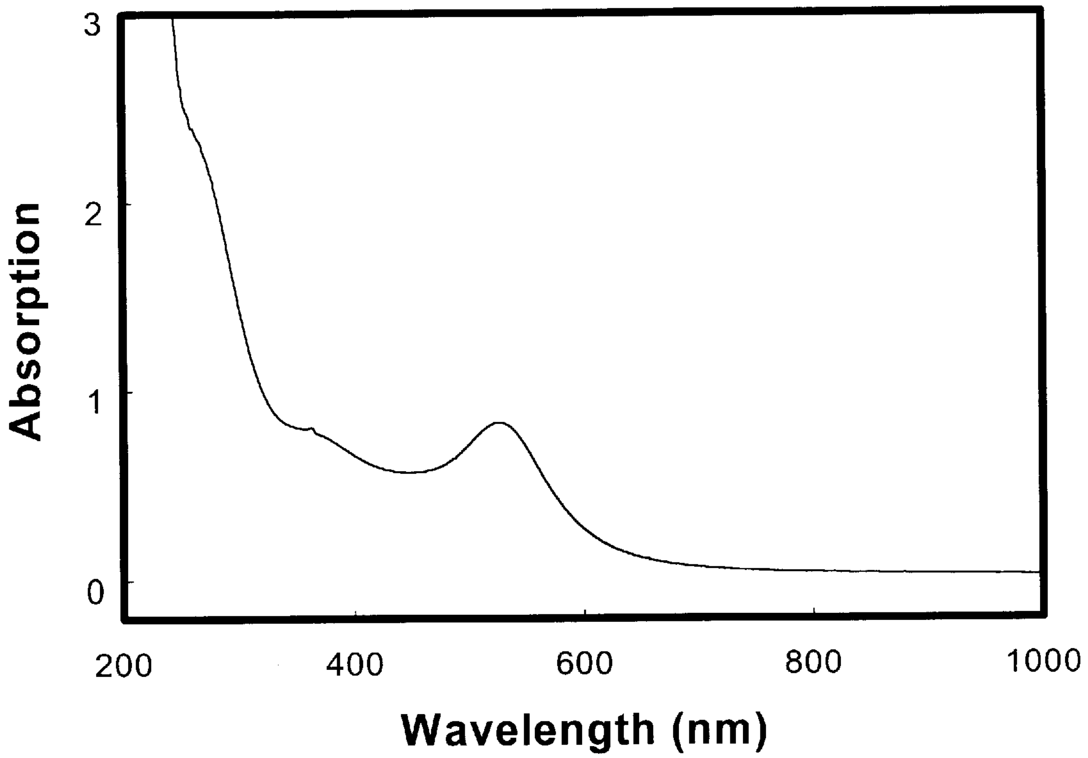
FIG. 4 shows a spectrum of plasmon peaks detected by nanometer-sized Au particles in the polymer matrix containing nanometer-sized Au particles manufactured in a twenty-second preferred embodiment of the present invention.

The size of the gold particles in the dendrimers measured through the TEM was 5 nm on the average and the golds were dispersed well without agglomeration. To indicate the formation of gold, a result that plasmon peaks of golds were measured with ultraviolet-visible (UV-VIS) ray absorption spectrum is shown in FIG. 4.

Embodiment 24

In the same way as the embodiment 1, the composite material was manufactured using $HAuCl_4$ as the metal precursor. The size of the gold particles in the dendrimers measured through the TEM was 10 nm on the average and the gold particles were dispersed well without agglomeration.

Embodiment 25

In the same way as the embodiment 1, the composite material was manufactured using metal salts in which $HAuCl_4$ and $AgBF_4$ were mixed in a molar ratio of 1:1 as the metal precursor.

Embodiment 26

In the same way as the embodiment 1, the composite material was manufactured by using $FeCl_2$ as the metal precursor.

Embodiment 27

In the same way as the embodiment 1, the composite material was manufactured using $CoCl_2$ as the metal precursor.

As described above, according to the present invention, the process of manufacturing metallic nano-particles and of dispersing the nano-particles into the matrix is simplified. Moreover, the problem of the conventional composite material, i.e., the formation of agglomeration between the nano-particles, can be solved in such a manner that the precursors of the metal particles are dispersed well in the matrix in the molecular level and manufactured in the final type (mainly, a film type), and the metal is reduced in-situ by the light, and thereby the size of the particles can be adjusted according to the matrix and the composite material without agglomeration can be manufactured.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for manufacturing composite polymers containing nanometer-sized metal particles, the method comprising the steps of:

dissolving a polymer matrix in a solvent to form a polymer matrix solution;

dispersing at least one metal precursor into the polymer matrix solution;

evaporating the solvent to form a polymer matrix film having the metal precursor uniformly distributed therein; and irradiating rays of light on the polymer matrix film containing the metal precursor to thereby reduce the metal precursor into uniformly distributed metal nano-particles and fix the metal nano-particles in the matrix film.

2. The method as claimed in claim 1, wherein the polymer matrix material is formed of at least one polymer and inorganic matter, at least one polymer having at least one functional group forming an active radical by exciting electrons by the irradiation of the rays of light and by doing $\pi\rightarrow\pi^*$ transition or $n\rightarrow\pi^*$ transition, the inorganic matter being compatible with the at least one polymer.

3. The method as claimed in claim 1, wherein the polymer matrix material is selected from carbonyl groups, heteroatoms having a lone-pair electron structure, and copolymers containing their functional groups.

4. The method as claimed in claim 1, wherein the polymer matrix material has at least one polymer structure selected from the group consisting of linear, nonlinear, dendrimer and hyperbranch polymer structures.

5. The method as claimed in one of claims 1, wherein the polymer matrix material is at least one polymer selected from the group consisting of compositions or derivatives of polypropylene, biaxial orientation polypropylene, polyethylene, polystyrene, polymethyl methacrylate, polyamide 6, polyethylene terephthalate, poly-4-methyl-pentene, polybutylene, polypentadiene, polyvinyl chloride, polycarbonate, polybutylene terephthalate, polydimethylsiloxane, polysulfone, polyimide, cellulose, cellulose acetate, ethylene-propylene copolymer, ethylene-butene-propylene terpolymer, polyoxazoline, polyethylene oxide, polypropylene oxide, and polyvinylpyrrolidone.

6. The method as claimed in claim 1, wherein the metal precursor uses metal salts capable of making nanometer sized metal particles.

7. The method as claimed in claim 1, wherein the at least one metal precursor is selected from a group consisting of Au, Pt, Pd, Cu, Ag, Co, Fe, Ni, Mn, Sm, Nd, Pr, Gd, Ti, Zr, Si and In, their binary alloys, their ternary alloys and their intermetallic compounds.

8. The method as claimed in claim 1 wherein the at least one metal precursor is selected from a group of Au, Pt, Pd, Cu, Ag, Co, Fe, Ni, Mn, Sm, Nd, Pr, Gd, Ti, Zr, Si and In, and further including one selected from iron oxide, barium ferrite and strontium ferrite.

9. The method as claimed in claim 1, wherein the rays of light are within a visible to ultraviolet light bandwidth.

10. The method as claimed in claim 1, wherein an amount of the metal precursors is in the range from 1:100 to 2:1 in a molar ratio of metal to the polymer matrix functional group.

* * * * *